United States Patent
Everett, Jr. et al.

(10) Patent No.: US 12,246,344 B2
(45) Date of Patent: Mar. 11, 2025

(54) SILICONE AND SILOXANE-BASED IMPREGNATED COATING AND POLYMERIC MATERIALS FOR CONDITIONING

(71) Applicant: Spectrum Brands, Inc., Middleton, WI (US)

(72) Inventors: David W. Everett, Jr., Verona, WI (US); Maciej Murzynski, Verona, WI (US); Giovanni Gonzalez, Sun Prairie, WI (US); Richard A. Harthun, Eagle, WI (US); Daniele Rosati, Verona, WI (US)

(73) Assignee: Spectrum Brands, Inc., Middleton, WI (US)

( * ) Notice: Subject to any disclaimer, the term of this patent is extended or adjusted under 35 U.S.C. 154(b) by 871 days.

(21) Appl. No.: 16/935,918

(22) Filed: Jul. 22, 2020

(65) Prior Publication Data
US 2020/0346247 A1 Nov. 5, 2020

Related U.S. Application Data

(60) Continuation of application No. 14/454,358, filed on Aug. 7, 2014, now abandoned, which is a division of application No. 12/645,696, filed on Dec. 23, 2009, now abandoned.

(60) Provisional application No. 61/141,939, filed on Dec. 31, 2008.

(51) Int. Cl.
| | |
|---|---|
| *B05D 5/00* | (2006.01) |
| *A45D 1/04* | (2006.01) |
| *A46D 1/00* | (2006.01) |
| *B32B 37/08* | (2006.01) |
| *A45D 24/22* | (2006.01) |
| *A46B 11/00* | (2006.01) |

(52) U.S. Cl.
CPC ................ *B05D 5/00* (2013.01); *A45D 1/04* (2013.01); *A46D 1/00* (2013.01); *B32B 37/08* (2013.01); *A45D 24/22* (2013.01); *A46B 11/00* (2013.01); *A46B 2200/104* (2013.01)

(58) Field of Classification Search
CPC . B05D 5/00; A45D 1/04; A45D 24/22; A46D 1/00; B32B 37/08; A46B 11/00; A46B 2200/104
See application file for complete search history.

(56) References Cited

U.S. PATENT DOCUMENTS

| | | | |
|---|---|---|---|
| 4,178,364 A | 12/1979 | Rucker | |
| 4,242,567 A | 12/1980 | Carter | |
| 4,867,881 A | 9/1989 | Kinzer | |
| 5,073,365 A * | 12/1991 | Katz | A61F 13/00 |
| | | | 424/501 |
| 5,261,426 A | 11/1993 | Kellett et al. | |
| 6,001,374 A | 12/1999 | Nichols | |
| 6,090,399 A * | 7/2000 | Ghosh | C09D 5/1625 |
| | | | 424/405 |
| 2005/0169876 A1 | 8/2005 | De La Mettrie | |
| 2006/0124625 A1 * | 6/2006 | Keig | A45D 1/04 |
| | | | 219/222 |
| 2008/0099031 A1 | 5/2008 | Walters et al. | |

FOREIGN PATENT DOCUMENTS

| | | |
|---|---|---|
| WO | 1999044565 A1 | 9/1999 |
| WO | 1999044567 A1 | 9/1999 |
| WO | 2008052219 A2 | 5/2018 |

OTHER PUBLICATIONS

Schaefer. Silicones in Hair Care. Cosmetics and Toiletries [online[; 2008; downloaded from <URL https://www.cosmeticsandtoiletries.com/cosmetic-ingredients/moisturizing/news/21840338/silicones-in-hair-care-making-innovative-solutions-possible > on Feb. 25, 2023; 4 pages. (Year: 2008).*
Extended European Search Report, for European Application No. 09252927.0, mailed May 12, 2010, (6 pages).
European Office Action received for European Application No. 09252927.0, mailed Apr. 2, 2014, (4 pages).
European Communication Regarding Third Party Observation issued in connection with European Application No. 09252927.0, mailed Oct. 10, 2015, (8 pages).
Extended European Search Report, for European Application No. 15183616.0, mailed Jan. 29, 2016, (6 pages).
Paola Persico, "Additivation of Polyamide Fibers by Means of Micro- and Nano-Particles Containing Jojoba Oil" (2006); PhD Thesis, Universita di Napoli "Federico II", (111 pages).

* cited by examiner

*Primary Examiner* — David Browe
(74) *Attorney, Agent, or Firm* — Kagan Binder, PLLC

(57) ABSTRACT

The present disclosure relates to a personal care device having a conditioning layer comprising a porous matrix comprising pores and having a hydrophobic conditioning agent fluid dispersed in the pores so that the conditioning agent can migrate to an exposed surface of the conditioning layer and then may be transferred to hair or skin surfaces. The conditioning layer may be prepared by preparing an immiscible conditioning composition comprising a hydrophilic material that is capable of being cured, and a hydrophobic conditioning agent. The immiscible composition is cured to form a conditioning layer that is a porous matrix formed from the hydrophilic material, the porous matrix having the hydrophobic conditioning agent fluid dispersed in the pores thereof.

13 Claims, 6 Drawing Sheets

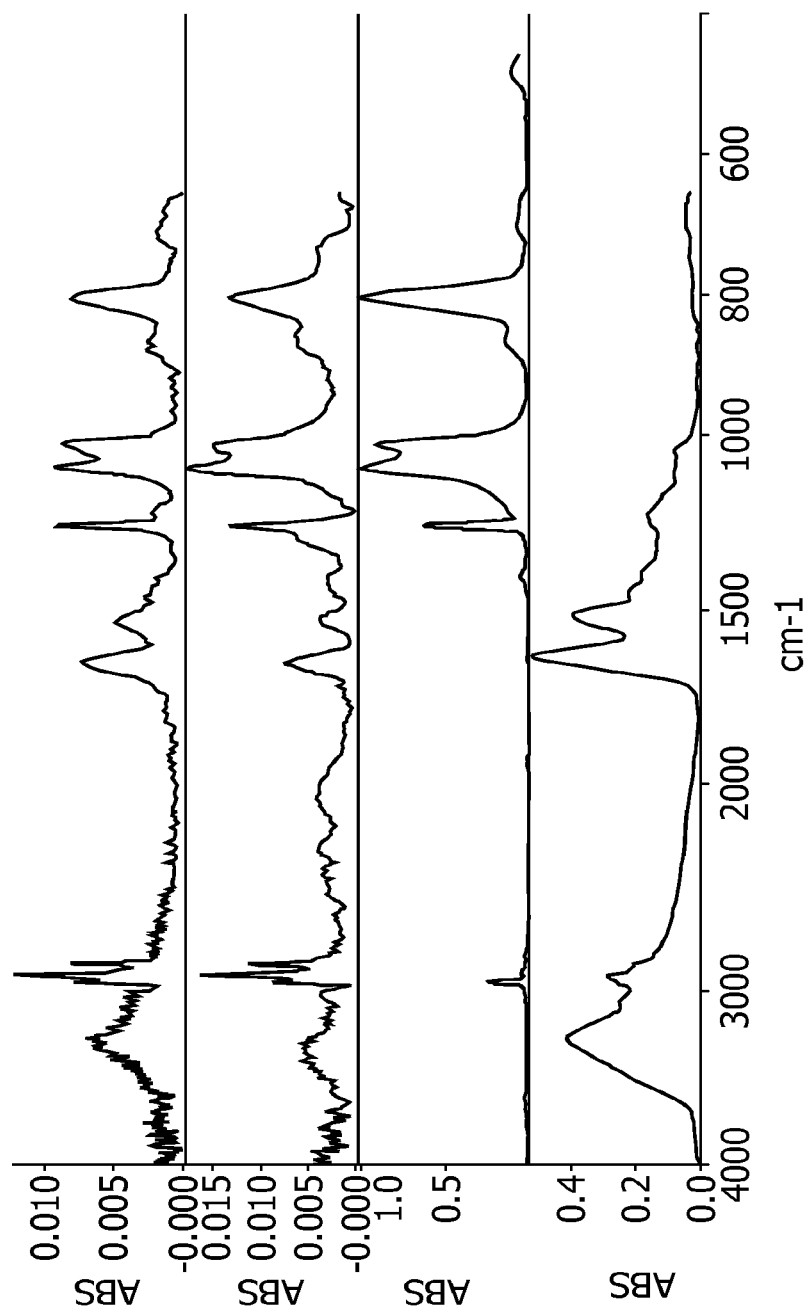

SILICONE AND SILOXANE-BASED IMPREGNATED COATING AND POLYMERIC MATERIALS FOR CONDITIONING

CROSS-REFERENCE TO RELATED APPLICATION

This application is a Continuation application of U.S. patent application Ser. No. 14/454,358, filed Aug. 7, 2014, which is a Divisional application of U.S. patent application Ser. No. 12/645,696, filed Dec. 23, 2009, which in turn claims priority from U.S. Provisional Patent Application Ser. No. 61/141,939, filed Dec. 31, 2008, the entire contents of each of which are incorporated herein by reference.

FIELD OF THE DISCLOSURE

The present disclosure generally relates to a personal care device comprising an immiscible conditioning composition formed by combining a hydrophilic matrix, such as a polymeric material, and a hydrophobic conditioning agent. More particularly, the present disclosure relates to a personal care device comprising a hydrophilic matrix, such as a polymeric material, and a hydrophobic conditioning agent dispersed therein, such as a silicone or a siloxane-based agent suitable for transferring from the device surface, and more particularly the matrix surface, to hair or skin surfaces contact therewith.

BACKGROUND OF THE DISCLOSURE

Conditioning agents are commonly employed to enhance the manageability, health and/or appearance of the hair and skin surfaces of humans and animals. A variety of conditions agents are known, including various modified proteins and other film-forming natural and synthetic polymers, as well as silicones. Typically, these conditioning agents are in the form of a paste, cream, liquid, or gel. Conventionally, these agents have been used by applying directly to the hair or skin surface.

Alternatively, however, conditioning agents, such as silicones, may be used by incorporating them into a skin-care or hair-care productor device. For example, the agents may be added to liquid coatings, applied to a surface of a skin-care or hair-care product or device and dried or cured to create a coating. The resulting coatings may then transfer the conditioning agent (e.g., the silicone material) to skin or hair surfaces that come into contact therewith. Alternatively, the conditioning agent may be added to plastics used to manufacture the personal care products, to provide beneficial conditioning and moisturizing properties; again, the agent being transferred from the plastic surface to skin or hair that comes into contact therewith.

While previously known methods for conditioning the hair and skin by means of a skin-care or hair-care device successfully impart some benefits to the skin and hair, there are drawbacks. For example, the compositions and mixtures containing the conditioning agent (e.g., a silicon agent) are typically homogeneous or miscible. As such, it is difficult for the conditioning agent to separate from the mixture to provide maximum conditioning properties to the contact surface. More specifically, when a conventional silicon-containing composition is applied to the contact surface of a skin-care or hair-care device or product, the surface generally absorbs the entire composition, rather than just the conditioning agent. As such, repeated use of these compositions can lead to a build-up of undesirable effects, including, for example, a heavy, oily feel to the contact surface. Additionally, itis often difficult to transfer a significant amount of the agent from the device or product to the skin or hair surface over an extended period of time. This is because, once the conditioning agent on or near the surface of the device or product has been removed or transferred to the skin or hair, little of any additional benefit is obtained from using the product or device. The product or device therefore needs to be replaced in its entirety, adding to consumer costs and waste.

Accordingly, there remains a need in the art for a device that includes a conditioning agent that can be incorporated into a skin-care or hair-care product or device in order to impart beneficial conditioning properties to the skin and hair over an extended period of time.

SUMMARY OF THE DISCLOSURE

Briefly, therefore, the present disclosure is directed to a personal care device comprising a component having a contact surface (i.e., a surface designed to contact the skin or hair), the contact surface component comprising an immiscible composition of a hydrophobic conditioning agent and a hydrophilic material, wherein the hydrophobic conditioning agent is a fluid and the hydrophilic material is a porous solid, and further wherein the hydrophobic conditioning agent fluid is dispersed in the pores of the solid. In one particular embodiment, the hydrophilic material is a polymeric or ceramic material, and/or the contact surface component is selected from the group consisting of a handle, the teeth of a comb or brush, the barrel of a hair curler, or a surface of a hair straightener.

The present disclosure is further directed to a personal care device comprising a substrate and a conditioning layer for contacting a hair or skin surface. The conditioning contact layer comprises a porous matrix of a solid hydrophilic material and a hydrophobic conditioning agent fluid dispersed in the pores of the matrix of solid hydrophilic material. In one particular embodiment, the solid hydrophilic material of the matrix is a solid polymeric or ceramic material.

The present disclosure is still further directed to a method for making a personal care device comprising a component having a contact surface (i.e., a surface designed to contact the skin or hair), the contact surface component comprising a solid matrix of a porous, hydrophilic material and a hydrophobic conditioning agent fluid dispersed in the pores of the solid. The method comprises: (i) forming an immiscible composition comprising a hydrophobic conditioning agent fluid and a hydrophilic material; (ii) extruding the immiscible composition to form a personal care device; and, (iii) cooling the extruded device; wherein extrusion and cooling are carried out under conditions sufficient for the hydrophilic material to form a porous solid matrix having the hydrophobic conditioning agent fluid dispersed therein.

The present disclosure is further directed to a method for coating a personal care device with a conditioning layer for contacting a hair or skin surface. The method comprises: preparing an immiscible composition comprising a hydrophobic conditioning agent fluid and a hydrophilic material; forming the immiscible composition into a layer wherein the hydrophilic material is a porous solid matrix having the hydrophobic conditioning agent fluid dispersed therein; and, applying the layer to a surface of a component of the personal care device. In one particular embodiment, the immiscible composition is formed into a layer using a sol-gel process. In this or another particular embodiment, the layer is applied to a component of the personal care device selected from the group consisting of a handle, the teeth of a comb or brush, the barrel of a hair curler, or, a surface of a hair straightener.

BRIEF DESCRIPTION OF THE DRAWINGS

FIGS. 4A-4D depicts FTIR spectra, as further detailed in Example 1. In particular, FIGS. 4A and 4B depict FTIR spectra for hair samples after undergoing 30 and 10,000 brush strokes, respectively, using brushes prepared in accordance with the present disclosure. FIGS. 4C and 4D are reference FTIR spectra, 4C illustrating the spectra of the conditioning agent used, and 4D illustrating the spectra of the hair sample prior to being brushed.

FIG. 5A depicts a FTIR spectrum obtained during core analysis of a brush bristle prepared in accordance with the present disclosure. FIGS. 5B and 5C depict FTIR spectra of hydrophilic polymeric materials (FIG. 5B-Nylon 6; FIG. 5C-Nylon 6,6), used to prepare the brush bristles. FIG. 5D depicts a FTIR spectrum of a conditioning agent (PDMS) used to prepare the brush bristles of FIG. 5A.

FIG. 6A depicts a FTIR spectrum obtained during analysis of a hair straightener plate in accordance with the present disclosure. FIG. 6B depicts a FTIR spectrum obtained from a hair sample after application of the hair straightener. FIG. 6C depicts a FTIR spectrum of a reference conditioning agent (PDMS) used to coat the hair straightener plate.

It is to be noted that corresponding reference characters indicate corresponding parts throughout the several views of the drawings.

Figure 1:
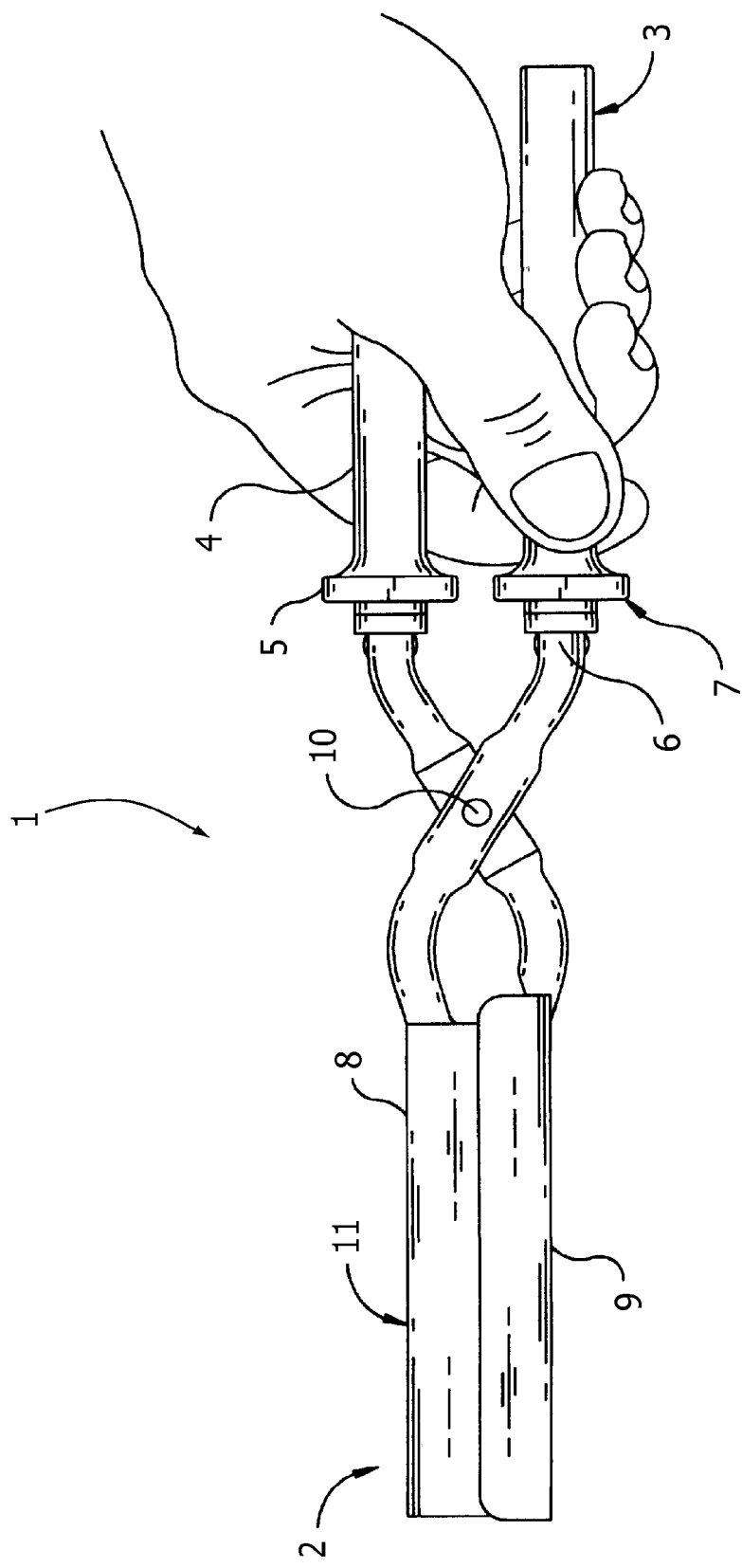
FIG. 1 depicts a hair-curling device of an embodiment of the present disclosure.

It is to be further noted that the design or configuration of the components presented in these figures are not to scale, and/or are intended for purposes of illustration only. Accordingly, the design or configuration of the components may be other than herein described without departing from the intended scope of the present disclosure. These figures should therefore not be viewed in a limiting sense.

DETAILED DESCRIPTION OF THE DISCLOSURE

In accordance with the present disclosure, it has been discovered that an improved personal care device that is capable of imparting benefit to skin or hair that comes into contact with the device may be achieved by proper selection of the materials from which the device, or a component or layer of the device, is prepared. In particular, it has been discovered that such a device may be prepared having a conditioning agent incorporated into the device, or component or layer thereof, during manufacture of the device, or component or layer, itself. It has further been discovered that by proper selection of the conditioning agent and the material from which the device, or component or layer, in which the conditioning agent is incorporated, an increased amount of the conditioning agent may be transferred to the skin or hair. Specifically, it has been discovered that, by incorporating a hydrophobic conditioning agent with a hydrophilic material used to prepare the device, or component or layer thereof, the inherently immiscible materials (or the naturally repulsive forces in the materials) help the conditioning agent to naturally migrate to the surface of the device, or component or layer, over time, thus increasing the amount of agent present at or near the device, or component or layer, surface (i.e., the device contact surface) that is available for transfer to the surface of the skin or hair of the subject (i.e., the subject contact surface).

A. Terms

It is to be noted that as used herein, the following terms or phrases, or variations thereof, generally have the following meanings.

The term "device" generally refers to a device, such as a personal care device or a hair styling device, used to impart beneficial hair or skin properties to the body of a human or animal.

The term "hair styling device" generally refers to a device used to style or fix hair into a desired configuration, such as imparting a style or temporary curl or set (straight or curly) to human or animal hair and retaining or maintaining (grooming, restyling) a desired set or curl configuration. Thus, the present disclosure can include hair styling, hair fixative and hair grooming products that conventionally are applied to wet, dry or semi-dry hair. The term also includes devices that groom hair while making contact with skin surfaces, such as a shaver, epilator, razor and the like, and their attachments.

The term "contact surface" generally refers to either the "subject contact surface", or the surface of the subject that comes into contact with the device of the present disclosure. For example, "subject contact surface" can refer to the hair or skin of the user of the device. Alternatively, "contact surface" may refer to the "device contact surface", or the surface of the device that comes into contact with the surface of the subject.

The term "immiscible" generally refers to a composition that is substantially incapable of mixing or attaining homogeneity. Further, the term as used herein can also refer to a composition that comprises components that are substantially incompatible, i.e., substantially incapable of blending into a homogenous mixture.

The term "hydrophilic" generally refers to a compound or material that has an affinity for water, as opposed to an oil or other hydrophobic solvent (i.e., tending to dissolve in, mix with, or be wetted by water).

The term "hydrophobic" generally refers to a compound or material that lacks affinity for water (i.e., tending to repel and not absorb water, or tending not to dissolve in or mix with or be wetted by water).

The term "porous matrix" generally refers to a solid matrix of hydrophilic material (e.g., a ceramic, or other polymeric material) having pores therein, and more particularly to pores having a size in the range of from about 50 nanometers to about 50 microns (e.g., about 100 nanometers to about 25 microns, or about 150 nanometers to about 1 micron). As used in the present disclosure, the porous matrix can include a hydrophobic conditioning agent dispersed or present in the pores therein, and/or additive (e.g., a pigment) present within the matrix itself.

The term "substrate" as used herein generally refers to a part of a device. The substrate may be made of several materials, such as, for example, metal.

The term "extrusion" generally refers to a process where a material is processed or pressed (e.g., under an elevated temperature and/or pressure) through an opening or through an area having a certain size (e.g., a die), so as to shape the material to conform to the opening or area. In general, extrusion refers to a process that is used to shape a moldable composition without cutting, milling, sawing or the like, and usually includes pressing or passing the material through an opening having a pre-defined cross-sectional area.

The term "sol-gel" generally refers to a process involving the evolution of inorganic networks through the formation of a colloidal suspension (sol) and gelation of the sol to form a network in a continuous liquid phase (gel). Through sol-gel processing, small molecules can, for example, be converted into a ceramic material.

The term "flash point" as used herein generally refers to the lowest temperature at which a liquid can form an ignitable mixture in air; that is, it is the minimum temperature at which there is a sufficient concentration of evaporated fuel in the air for combustion to propagate after an ignition source has been introduced.

The term "dip coating" generally refers to the immersing of a substrate into a tank containing coating material, removing the device from the tank, and allowing it to drain so that the coating is sustained on the substrate.

The term "spin coating" generally refers to a process of applying a coating to a substrate by placing a solution onto a substrate and rotating the substrate at high speed in order to spread the solution by centrifugal force.

B. Hydrophilic and Hydrophobic Components

1. General Device/Device Component

In one embodiment of the present disclosure, a personal care device (or a component or layer thereof) is disclosed that is suitable for imparting a benefit to the hair and/or skin, such as an improved sensory feel. The device includes or is prepared from an immiscible composition, which in turn includes or comprises a hydrophobic conditioning agent and a hydrophilic material (e.g., a polymeric or ceramic material). In the device (or component or layer thereof), the hydrophobic conditioning agent is in the form of a fluid, while the hydrophilic material is in the form of a solid matrix having pores in which the hydrophobic condition fluid is dispersed. Due to the hydrophilic and hydrophobic nature of the two materials, the materials naturally or inherently repel each other to some degree. This allows or causes the fluid conditioning agent to migrate from the pores of the solid matrix to a surface of the device, and then be transferred to a surface that comes into contact therewith (e.g., the user's hair or skin). Additionally, proper selection of, for example, (i) the material used for the matrix and/or the conditioning agent (e.g., the materials being selected to increase or decrease the repulsive nature, by means of selecting more or less hydrophobic or hydrophilic materials, and/or the viscosity of the conditioning agent), (ii) the pore density (or number of pores) and/or pore size, and/or (iii) the concentration of the conditioning agent present in the matrix, may be used to prolong or increase the duration over which the hydrophobic conditioning agent migrates from the matrix to the device surface.

In this regard it is to be noted that, in some embodiments, the immiscible composition may optionally include additional hydrophobic and/or hydrophilic components (e.g., pigments for the matrix or conditioning agent, a fragrance or scented material, etc.).

The conditioning agent used in the device (or composition used to prepare it) may be selected from essentially any hydrophobic conditioning agent known to be cosmetically acceptable in the hair and skin industries. Suitable conditioning agents include, for example, silicone-based oils, siloxane-based polymers, silicone derivatives, silicone polyesters, silicone polyether fluids, dimethyl silicone fluids, dimethyl silicone emulsions, amino silicone fluids, amino silicone emulsions, polydimethylsiloxane (hereinafter "PDMS"), and combinations thereof. More suitably, PDMS is used as the conditioning agent in the composition, in one or more particular embodiments.

It should be recognized that the conditioning agent desirably has a viscosity that does not significantly affect the make-up of the immiscible composition used to prepare the device, or device component, and/or does not significantly affect the ability of the conditioning agent to migrate from the pores of the solid matrix over an acceptable period of time. For example, if the conditioning agent is too viscous, it may affect the processability of the matrix material (e.g., a polymeric material), such a conditioning agent may lead to a tacky or gummy appearance of the immiscible composition, and/or the resulting device or device component surface.

Accordingly, a suitable conditioning agent typically has a viscosity of from about 5 centistokes to about 5000 centistokes. More suitably, the viscosity of the conditioning agent is from about 100 centistokes to about 1000 centistokes, or from about 250 centistokes to about 500 centistokes. In this regard it is to be understood, however, that the viscosity may be other than herein described without departing from the intended scope of the invention, the viscosity being modified, for example, in order to increase or decrease the rate of migration of the conditioning agent from the pores of the solid matrix.

Additionally, the immiscible composition used to prepare the device, or the device component or layer, typically comprises from about 0.1% by weight to about 12% by weight of the conditioning agent. More suitably, the composition comprises from about 0.5% by weight to about 10% by weight of the conditioning agent. Even more suitably, the composition comprises from about 1% by weight to about 5% by weight of the conditioning agent. In this regard it is to be understood, however, that the concentration of the conditioning agent may be other than herein described without departing from the intended scope of the invention, the concentration being modified, for example, in order to increase or decrease the rate of migration of the conditioning agent from the pores of the solid matrix.

With respect to the nature of the conditioning agent, it is to be noted that the flash point thereof is to be considered, particularly in view of the method or technique by which the device (or device component or layer) is prepared, and more particularly the temperatures to which the conditioning agent is exposed. In particular, it is to be noted that because the conditioning agent is a fluid within the resulting device (or device component or layer), or more specifically is in a fluid state when in use (e.g., a fluid at room temperature, or a fluid at an elevated temperature, the device being, for example, a curling iron and therefore being heated when used, the heat for example liquefying or becoming a fluid once heated sufficiently), evaporation and/or the flash point of the conditioning agent is to be considered. Accordingly, in one or more embodiments of the present disclosure, the conditioning agent is selected such that little if any evaporation occurs at or above room temperature for an extended period of time. More particularly, however, the conditioning agent is selected such that it has a flash point of at least about 150° C. (e.g., about 160° C., about 170° C., about 180° C., about 190° C., about 200° C., about 230° C. or more). If the flash point of the conditioning agent is too low, then the conditioning agent may not survive the conditions under which the device (or device component or layer) are prepared or formed, and/or the heating conditions of certain devices (e.g., hair straightener or curling), and may subsequently breakdown.

Along with the conditioning agent, the immiscible composition used to prepare the device (or device component or layer) comprises a hydrophilic material, which may be generally selected from those materials known in the art. Typically, however, the hydrophobic material is a polymeric or ceramic material. Suitable polymeric materials include, but are not limited to: Nylon 6; Nylon 6,6; Nylon 6,10; Nylon 6,12; acrylonitrile butadiene styrene (ABS); acetal; olefinic thermoplastic elastomer (TEO); thermoplastic elastomer (TPE); polytrimethylene terephthalate (PTT); and combinations thereof. Typically, the immiscible composition comprises from about 90% by weight to less than about 100% by weight of the hydrophilic polymeric material, or about 92% to about 99%, or about 95% to about 98%.

As previously noted, the immiscible composition can also further include additional additives that are known and used in the industry. For example, in one embodiment, the composition includes a pigment. Suitable pigments that can be used include those that are known to those skilled in the art, such as pearlescent, metallic, fluorescent, phosphorescent, thermochromic, photochromic, titanium dioxide pigments and the like.

Other potentially suitable additives that may be present in the immiscible composition include, for example: reducing agents, antioxidants, sequestering agents, softeners, antifoams, moisturizers, emollients, basifying agents, gelling agents, wetting agents, thickening agents, spreading agents, dispersants, plasticizers, sunscreens, direct dyes or oxidation dyes, pigments, mineral fillers, clays, colloidal minerals, nacres, nacreous agents, fragrances, peptizers, preserving agents, fixing or non-fixing polymers, ceramides, proteins, antioxidants, active agents, vitamins, antidandruff agents, aliphatic or aromatic alcohols, and more particularly ethanol, benzyl alcohol, modified or unmodified polyols, such as glycerol, glycol, propylene glycol, dipropylene glycol, butylene glycol or butyl diglycol, volatile silicones, mineral, organic or plant oils, oxyethylenated or non-oxyethylenated waxes, paraffins, fatty acids, associative or non-associative thickening polymers, fatty amides, fatty esters, fatty alcohols, and the like.

As further detailed elsewhere herein, the immiscible composition may be formed into any number of known personal care devices, or components or layers thereof, using methods and techniques generally known in the art. For example, the personal care device comprising the composition can be a conditioning strip of a razor or shaver (the composition being the conditioning strip or handle of the razor or shaver, or present therein), such that when the device comes into contact with the user's skin, the conditioning agent migrates into the skin and provides beneficial skin care properties.

Alternatively, the personal care device comprising the composition can be a hair styling device, such as a brush or comb. When the hair styling device comes into contact with hair, the conditioning agent is transferred from the composition in the hair styling device into or onto the hair of the user. When the conditioning agent is transferred into or onto the hair, it provides beneficial hair care properties, as well as an improved sensory feel. Suitable hair styling devices that can comprise the composition include, for example, hair straighteners, curling irons, combs, epilators, brushes, shavers, razors, curlers, trimmers, clippers, dryers, and the like, their attachments, and combinations thereof.

2. Thin Layer on Device/Device Component

In an alternative embodiment, a personal care device including a substrate and a conditioning layer (comprising or prepared from the immiscible composition) is present thereon (as opposed to be incorporated into the substrate, during formation of the substrate itself). The conditioning layer again includes both hydrophilic and hydrophobic materials, as previously detailed above. Specifically, the conditioning layer includes a hydrophilic porous matrix and the hydrophobic conditioning agent, both of which are described above.

The substrate, upon which the conditioning layer is applied or present, may be selected generally from those materials known in the art, including, for example, aluminum and steel, as well as various known ceramic and plastic or polymeric materials.

The physical properties (e.g., dimension, thickness, etc.) may be optimized for a given or desired application (the thickness, for example, increasing at the desired concentration of conditioning agent, and/or duration of migration and/or release of the agent, increases). Typically, however, a suitable thickness for the conditioning layer is from about 1 micron to about 250 microns, about 2 microns to about 200 microns, about 4 microns to about 150 microns, or about 5 microns to about 100 microns.

As previously noted, the composition and/or properties of the conditioning agent, including viscosity, and/or the concentration thereof, may be selected in order to optimize performance of the device for a given purpose. In one particular embodiment, however, the viscosity of the conditioning agent within the noted conditioning layer has a viscosity of from about 5 to about 5000 centistokes, or about 100 to about 1000 centistokes, or about 250 to about 500 centistokes, and, in one particular embodiment, is about 350 centistokes.

In general, the conditioning layer, or more specifically the solid, porous matrix of the conditioning layer, may comprise from about 0.1% by weight to about 12% by weight of the hydrophobic conditioning agent, and in some particular embodiments may comprise from about 0.1% by weight to about 10% by weight, or from about 1% by weight to about 8% by weight, or even about 5% by weight, of the conditioning agent. Additionally, the conditioning layer, or more specifically the solid, porous matrix of the condition layer, may further comprise a Along with the conditioning agent, the porous matrix can further comprise a hydrophilic material, such as a ceramic or polymeric material, the concentration thereof being for example from about 40% by weight to about 99% by weight, or from about 50% to about 90% by weight, or from about 60% to about 80% by weight, of a ceramic or polymericmaterial. In one particular embodiment, the porous matrix comprises about 70% by weight of a ceramic or polymeric material.

The conditioning layer, or more specifically the solid, porous matrix of the conditioning layer, further include additional additives known in the art, such as a pigment, a fragrance or scent, etc. Suitable pigments that can be used include, for example, mineral, plant color and synthetic pigments.

Further, the conditioning layer, or more particularly the solid, porous matrix, may include other suitable additives, such as, for example, those chosen from: reducing agents, antioxidants, sequestering agents, softeners, antifoams, moisturizers, emollients, basifying agents, gelling agents, wetting agents, thickening agents, spreading agents, dispersants, plasticizers, sunscreens, direct dyes or oxidation dyes, pigments, mineral fillers, clays, colloidal minerals, nacres, nacreous agents, fragrances, peptizers, preserving agents, fixing or non-fixing polymers, ceramides, proteins, antioxidants, active agents, vitamins, antidandruff agents, aliphatic or aromatic alcohols, and more particularly ethanol, benzyl alcohol, modified or unmodified polyols, such as glycerol, glycol, propylene glycol, dipropylene glycol, butylene glycol or butyl diglycol, volatile silicones, mineral, organic or plant oils, oxyethylenated or non-oxyethylenated waxes, paraffins, fatty acids, associative or non-associative thickening polymers, fatty amides, fatty esters, fatty alcohols, and the like.

C. Exemplary Embodiments

As previously noted, the immiscible composition of the present disclosure may be incorporated into any number of known personal care devices or device components. Accordingly, the following discussion is provided for purposes of illustration only, and therefore should not be viewed in a limiting sense.

Referring now to FIG. 1, an exemplary personal care device (a hair curling iron) 1 is shown. In this device, a substrate 2, having a conditioning layer (i.e., a layer comprising a porous, solid matrix of hydrophilic material having present in the pores thereof a hydrophilic conditioning agent in fluid form) present thereon, is also shown. The substrate 2 has a first curling element or barrel 8, and a second curling element 9, the second element having a curved shaped or formed so as to receive a portion of the first element or barrel therein. The personal care device 1 further comprises a hinge 10, a grip 4, a shaft 6, a guard 5, a handle 7 and a handle element 3. As shown in FIG. 1, the substrate 2 comprises a conditioning layer 11, which is applied to the contact surface of element or barrel 8 and/or element 9 (not shown), when the personal care device 1 is being used.

In this regard it is to be noted that additionally, or alternatively, a conditioning layer may be applied to the grip 4 of the device, the grip acting as a substrate for the condition layer. It is to be further noted that, additionally or alternatively, rather than a conditioning layer being present on a substrate (i.e., elements 8 and/or 9 of the device, or the grip 4), the immiscible composition may be used to form the grip and/or one or more of the elements, the conditioning agent thus being present therein and migrating to the surface thereof.

Figure 2:
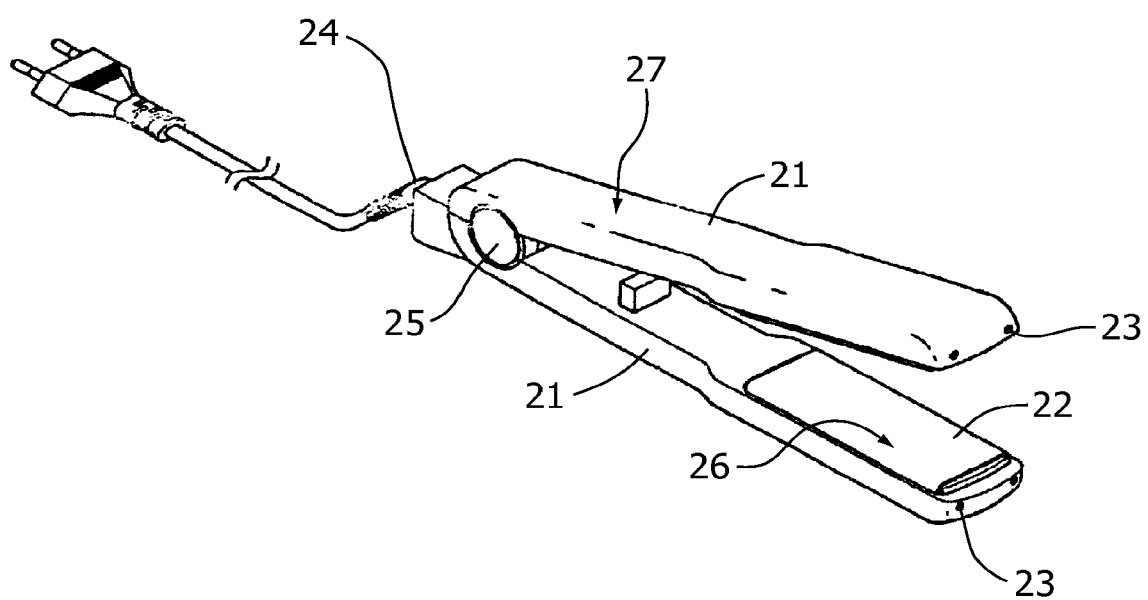
FIG. 2 depicts a hair-straightening device of another embodiment of the present disclosure.

Referring now to FIG. 2, another exemplary personal care device (a hair straightener) 24 is shown. In this device, a substrate 22 that is capable of being heated has a conditioning layer (i.e., a layer comprising a porous, solid matrix of hydrophilic material having present in the pores thereof a hydrophilic conditioning agent in fluid form) present thereon, is also shown. A substrate 22 is present on one of the arms 21 (which also serves as handles), a jointing unit 25 linking the two arms, and apertures 23. The substrate 22 comprises a conditioning layer 26 present on the surface thereof, which when applied to the contact surface can straighten hair while conditioning the hair with the hydrophobic conditioning agent.

In this regard it is to be noted that, in another embodiment (not shown), the substrate 22 is present on both arms 21 and both substrates comprise the conditioning layer. In this regard it is to be further noted that additionally, or alternatively, a conditioning layer may be applied to the outer surfaces 27 of the arms 21 of the device, which also serves as handles for the device, the arms acting as a substrate for the condition layer. It is to be further noted that, additionally or alternatively, rather than a conditioning layer being present on a substrate (i.e., 22 of the device, or the arms 21), the immiscible composition may be used to form the arms 21 and/or one or more of the substrates 22, the conditioning agent thus being present therein and migrating to the surface thereof.

Figure 3:
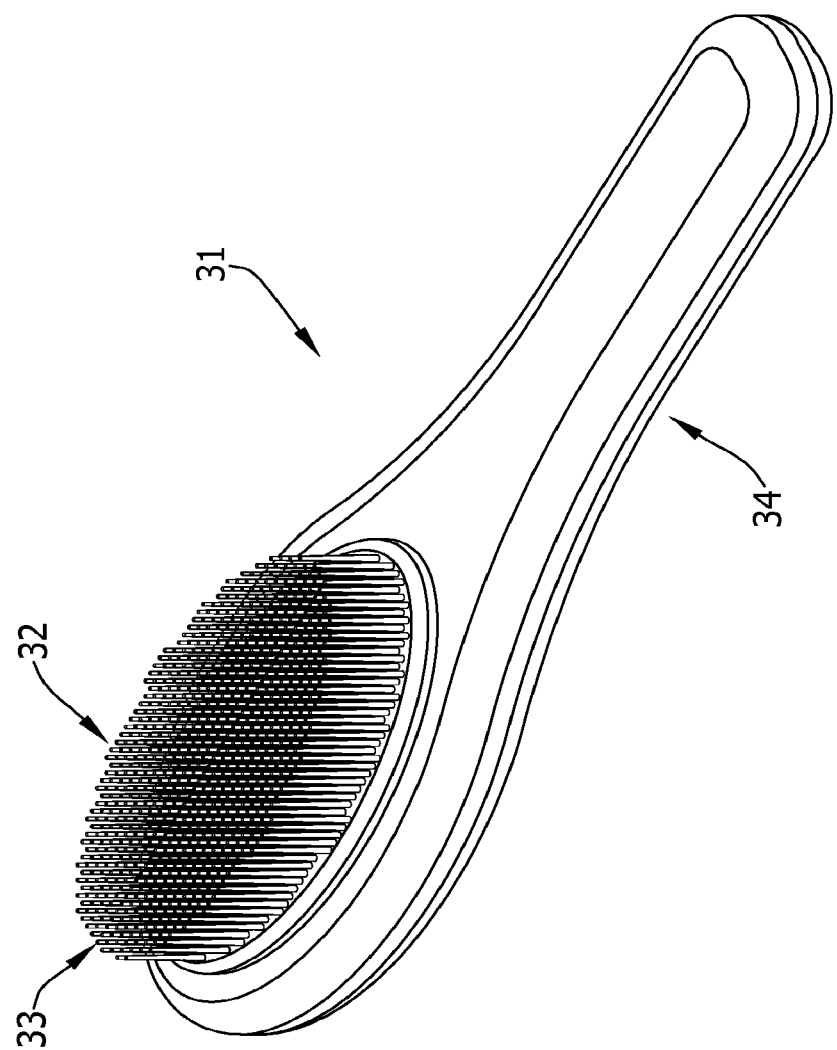
FIG. 3 depicts a hair-brushing device of an embodiment of the present disclosure.

Referring now to FIG. 3, an exemplary personal care device (hair brush) 31 is shown. In this device, a substrate 32 for contacting skin or hair comprises an immiscible composition of a hydrophobic conditioning agent and a hydrophilic material. The substrate 32 comprises bristles 33, which comprise the immiscible composition. The bristles 33 are attached to a handle 34. The substrate 32 of the device 31 is applied to the contact surface of a user so that the bristles 33 come in contact with the user's hair. When the bristles 33 come in contact with the user's hair, the hydrophobic conditioning agent is able to migrate from the bristles 33 to the user's hair and impart a beneficial conditioning effect.

D. Methods of Preparation

Additionally, in another alternative embodiment, the present disclosure relates to a method for making personal care devices with a conditioning agent present therein. The method involves forming an immiscible composition, as detailed herein above, and extruding or molding the composition to form a device (or a component thereof, such as a handle, brush bristles, etc., the device later being assembled using such components). As discussed above, the composition has both a hydrophilic material (e.g., a polymeric material) and a hydrophobic material (i.e., fluid conditioning agent), which allow for the conditioning agent to migrate to a contact surface of the device or component, when used. The composition can be extruded or molded into various shapes and sizes to form a desired device (or device component).

The immiscible composition itself can be formed by any known or otherwise effective technique suitable for providing such a composition, provided that the resulting composition has the chemical properties as described herein. Methods for forming the embodiments of the composition of the present disclosure include conventional formulation and mixing techniques.

There are a number of different variations of extrusion and/or molding equipment which are suitable for use in accordance with the present disclosure. Common extrusion equipment pieces include one or more of a mixer or mixing zone, an extrusion ram or screw, a press, a heating element, chambers that enable pressure to be applied to the composition, and an extrusion die or nozzle. Suitable molding equipment may include appropriate mixing and heating elements, a mold, pumps for transferring the composition thereto, and a press for closing the mold or forming the device (or device component).

A major characteristic of the extrusion equipment is movement of the extrusion with relation to the ram ("direct extrusion" occurs when the die is held stationary and the ram moves towards the die, whereas "indirect extrusion" occurs when the ram is held stationary and the die moves towards the ram); the position of the press (either vertical or horizontal); the type of drive (either hydraulic or mechanical); and, the type of load applied (either conventional or hydrostatic). Furthermore, some embodiments may use a single or twin screw auger, powered by an electric motor, or a ram, driven by hydraulic pressure.

It has been recognized that polymeric extrusion uses plastic chips or pellets, which can be dried, or alternatively softened or melted, in a hopper before going to a feed screw. The screw forces the composition through a die, thus forming the composition into the desired device (or device component) shape. The extrudate is cooled and solidified as it is pulled through the die.

Suitably, the composition can be formed by compounding the conditioning agent with various additives (e.g., a pigment), as detailed elsewhere herein. After compounding the conditioning agent, a suitable material for forming the solid matrix (e.g., a polymeric material) is melted with the conditioning agent and a pellet is generated. After generating the pellets, which contain the immiscible composition, they may be further subjected to the extrusion (or molding) process, or alternatively stored for later used. the pellets are extruded into a device. As previously noted, extrusion can be conducted by any method known to those skilled in the art, so long as the desired chemical properties of the composition are present and remain intact. It is to be recognized, however, that during extrusion, the temperature of the process, and thus for example the melting temperature of the polymeric material, are controlled so as not to exceed the flash point of the conditioning agent.

As noted, the device (or device component) may be extruded by any typical method known in the art utilizing typical extrusion equipment. The extrusion maybe continuous or semi-continuous. Suitably, hot extrusion can be done at an elevated temperature to keep the pelletized composition from hardening and to make it easier to push the material through a die.

In the present disclosure, the die may take on any particular shape or size that produces a device. Non-limiting examples of suitable die shapes include those in the form of a hair styling device, such as hair straighteners, curling irons, combs, epilators, brushes, shavers, razors, curlers, trimmers, clippers, dryers, and the like, their attachments, and combinations thereof, or alternatively some suitable component thereof (e.g., the handle of such a device, or the bristles or teeth of such a device).

After extrusion, through any known method including those embodiments described above, the resulting device comprises an immiscible composition, wherein when the device is applied to a contact surface of the hair or skin, the conditioning agent migrates from the device into or onto the contact surface of the hair or skin, in order to impart a benefit thereto.

In an alternative embodiment, the present disclosure additionally relates to a method for coating a personal care device with a conditioning layer that comprises the immiscible composition. The method comprises forming a solid, porous matrix of the hydrophilic material, through a sol-gel process. As previously noted, the pores of the matrix contain or include the hydrophobic conditioning agent. Additionally, the solid matrix itself, or the pores thereof, may include additional components or additives, including for example ceramics, a pigment, etc. After forming the porous matrix, the matrix is introduced or applied as a layer (or a series of layers) on a substrate. The matrix can be introduced onto the substrate through a variety of methods generally known in the art. Once applied to the substrate, the conditioning agent can migrate to an exposed surface of the solid, porous matrix, and may then be transferred therefrom to a contact surface of the hair or skin.

The porous matrix can be formed by any known or otherwise effective sol-gel technique, provided that the resulting porous matrix has the chemical properties as described herein.

Sol-gel processing is a method whereby small molecules can be converted into ceramic materials. As an example, such a material may be formed using the sol-gel technique from organic polymers and inorganic polymers. Generally, the technique involves forming a cationic network of metal alkoxides in an appropriate solvent (such as an alcohol with water and a catalyst). In the catalyzed solution, the alkoxides are partially or completely hydrolyzed and then polymerized to form molecules of a glass-like oxide or ceramic network linked by bridging oxygen atoms.

Accordingly, in one particular embodiment, the porous matrix is formed through a ceramics solution through a sol-gel process from metal alkoxides, for purposes of coating a desired device or product. After forming the porous matrix, the matrix is then introduced onto the substrate, generally using any known method in the art. Suitably, the porous matrix can be introduced onto the substrate by spin coating, wherein the porous matrix is coated onto the substrate by centrifugal force. The porous matrix is sprayed onto the substrate and then rotated at accelerated speeds at a constant rate until the desired thickness of the porous matrix is achieved. More suitably, the porous matrix can be introduced onto the substrate through dip coating, wherein the substrate is immersed into a tank containing the coating material. The substrate is then removed from the tank and allowed to dry, for example by force-air drying or heating (baking). Even more suitably, the porous matrix can be introduced onto the substrate by spraying. Any typical spraying process known in the art can be used, so long as the spray occurs in a controlled environment to prevent contamination. The conditioning layer comprising the porous matrix can then be cured at a temperature from about 160 C to about 300° C. Alternatively, the conditioning layer comprising the porous matrix can be cured at about room temperature.

Referring again to FIG. 1, the method may comprise introducing (e.g., spraying) the conditioning layer 11 onto the substrate 2 (and more particularly curling elements 8 and/or 9) of the personal care device 1. By coating the personal care device 1 with the conditioning layer comprising the porous matrix, the personal care device 1 can impart beneficial hair care properties to the user when applied to a contact surface of the hair.

Referring now to FIG. 2, the method may comprise introducing (e.g., spraying) the conditioning layer 26 onto the substrate 22 of the personal care device 24. When the arms 21 clamp down on the contact surface (e.g., hair), the substrate 22 comes into contact with the surface and transfers the conditioning agent from the substrate 22 to the contact surface. The contact surface of the hair absorbs the conditioning agent, which imparts beneficial hair care properties to the user.

Referring now to FIG. 3, the method may comprise introducing a conditioning layer (not shown) onto the substrate 32 of the personal care device 31. When the bristles 33 of the personal care device 31 come into contact with the contact surface the bristles 33 transfer the conditioning agent from the substrate 32 (which comprises the bristles 33) to the contact surface. The contact surface of the hair absorbs the conditioning agent, which imparts beneficial hair care properties to the user.

In another embodiment of the present disclosure, the personal care device comprises a removable surface or surfaces. Referring again to FIG. 1, in one particular embodiment, the curling elements 8 and/or 9 may be removable, such that when then porous matrix has exhausted the conditioning agent (i.e., the conditioning agent is no longer present in the porous matrix, or the state of the device is such that conditioning agent is no longer migrating from the porous matrix), the user can replace elements 8 and/or 9 with new curling elements that are also coated with the conditioning layer comprising the porous matrix. In this manner, the user of the personal care device 1 does not have to purchase an entirely new personal care device 1; rather, the user can keep the same personal care device 1 by replacing the curling elements 8 and/or 9, in which the conditioning agent has been exhausted, with a fresh set of elements comprising a new conditioning layer. This allows the user to save both cost and time.

Referring again to FIG. 2, the substrate 22 can be removable and replaced with a new substrate once the conditioning layer 26 has been exhausted through repeated use. As such, the user may not have to purchase an entirely new personal care device 24; rather, the user can replace the substrate 22 in which the conditioning layer is exhausted with a new substrate comprising a wholly new conditioning layer.

It is to be noted that in all of the exemplary embodiments and disclosures discussed above, the present disclosure is able to be used on both humans and animals.

The following Examples describe various embodiments of the present invention. Other embodiments within the scope of the appended claims will be apparent to a skilled artisan considering the specification or practice of the invention as described herein. It is intended that the specification, together with the Examples, be considered exemplary only, with the scope and spirit of the invention being indicated by the claims, which follow the Examples.

EXAMPLES

The following non-limiting examples are provided to further illustrate the present disclosure.

Example 1

Conditioning Release of PDMS onto Hair

The following example illustrates the release of a conditioning agent (e.g., PDMS) from an immiscible composition contained on a personal care device into a contact surface (hair).

The immiscible composition discussed above comprising a hydrophobic conditioning agent and a hydrophilic polymeric material was extruded into three personal care devices. More particularly, the devices were hair styling devices, and, specifically, the hair styling devices were brushes.

The three brushes contained PDMS as the conditioning agent in the immiscible composition. One brush, which was new, was life-tested for 10,000 strokes using means generally available in the art, a second brush, which was also new, was life-tested for 30 strokes using means generally available in the art, and a third brush was environmentally conditioned without stroking a reference hair sample. As used herein, the term "stroke" requires the device to travel a minimum of about three inches.

After previously experiencing 10,000 and 30 strokes, respectively, the first and second brush both demonstrated transfer of PDMS onto a reference hair sample. Moreover, the third brush, following environmental conditioning, continued to maintain the presence of PDMS within the brush bristles.

The transfer of PDMS from the immiscible composition into the reference hair sample was evaluated via micro-Fourier transform infrared spectroscopy in the attenuated total reflectance (ATR) mode. Fourier transform infrared spectroscopy (FTIR) involves the study of molecular vibrations, wherein a continuous beam of electromagnetic radiation is passed through or reflected off the surface of a sample thereby causing individual molecular bonds and groups of bonds to vibrate at characteristic frequencies and absorb infrared radiation at corresponding frequencies. As a result, different molecules generate distinct patterns of absorption known as "spectra", allowing one skilled in the art to characterize and identify certain molecules.

A first brush, which included the immiscible composition with PDMS as the conditioning agent, through testing generally known in the art, underwent 10,000 brush strokes. A second brush, which also included the immiscible composition with PDMS as the conditioning agent, through testing generally known in the art, underwent 30 brush strokes. After each brush had undergone their respective stroke processes, each brush was used to brush a unique section of a reference hair sample between 10 to 20 strokes. Though the present disclosure can work on both human and animal hair, the reference hair sample used for the exemplary embodiments is human hair obtained from standard hair suppliers known in the industry.

The reference hair samples were directly analyzed following brushing using FTIR spectra by wiping the hair samples directly onto an ATR crystal, which produced the results shown in FIGS. 4A-4D. No additional absorbances associated with the PDMS were detected within the limitations of the instrumentation.

FIG. 4D provides the spectrum results of a hair reference sample before being brushed with the 10,000 and 30 stroke brushes. FIG. 4A provides the spectrum results of a reference hair sample after being brushed with the 30 stroke brush. FIG. 4B provides the spectrum results of a reference hair sample after being brushed with the 10,000 stroke brush. FIG. 4C provides the spectrum results of a conditioning agent (PDMS) present in the reference hair sample.

The PDMS spectrum provides that PDMS is present at around 1300 $cm^{-1}$, 1200 $cm^{-1}$, and 800 cm. Analysis of the spectra of the hair samples brushed with the 10,000 and 30 stroke brushes provides that the peaks associated with PDMS are present in similar locations in the 10,000 and 30 stroke brush hair samples, whereas the peaks associated with PDMS are not present in the reference hair sample before brushing (FIG. 4D). Thus, the results show that the conditioning agent continues to migrate from a device comprising the immiscible composition to the contact surface (i.e., reference hair sample) after 30 and even 10,000 brush strokes.

The third brush containing the immiscible composition (with PDMS as the conditioning agent) was not tested on a reference hair sample, but, rather, was environmentally conditioned to determine the shelf life of the composition in a hairstyling device. First, the brush was conditioned for 48 hours at 49° C. and 90% relative humidity. Then, the third brush was conditioned for an additional 37 days at 55° C. After the conditioning process, the core material of the brush bristles was analyzed, the results of which are provided in detail in FIGS. 5A-5D.

Figures 5A, 5B, 5C, 5D:
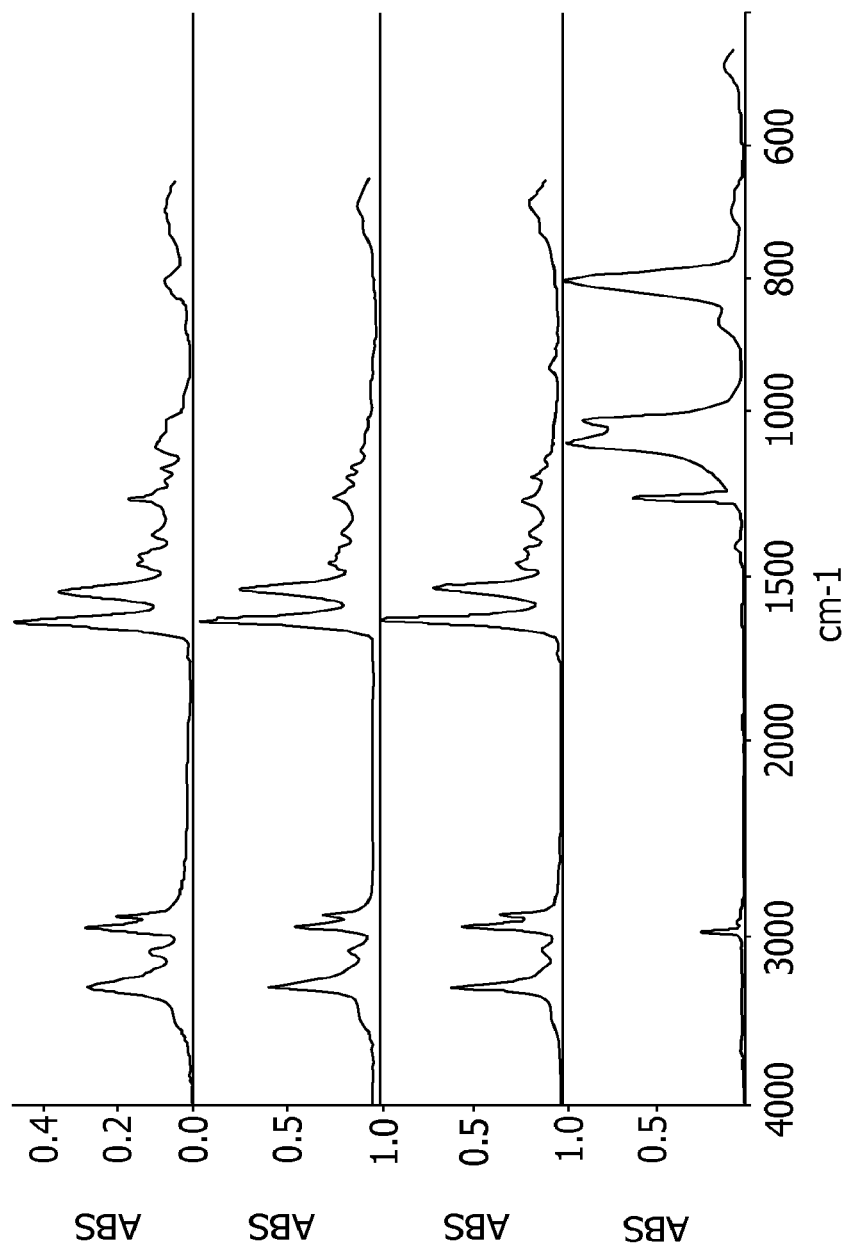
FIGS. 5A-5D depict FTIR spectra, as further detailed in Example 1. In particular.

FIG. 5A depicts a spectrum of the bristle core after the environmentally conditioning process described above. FIG. 5B depicts a spectrum of a hydrophilic polymeric material (Nylon 6) present in the bristle core. FIG. 5C depicts a spectrum of a hydrophilic polymeric material (Nylon 6,6) present in the bristle core. FIG. 5D depicts a spectrum of a hydrophobic conditioning agent (PDMS) present in the bristle core.

As provided for in FIGS. 5A-5D, one skilled in the art would recognize the PDMS peaks present in FIG. 5D at about the 1300-1200 $cm^{-1}$, 1100-1000 $cm^{-1}$ and the 700-900 cm$^{-1}$ marks and the corresponding peaks present in the bristle core spectrum in FIG. 5A. Applicants further note that various types of nylon polymeric materials are spectrally indistinguishable and a melting point determination is generally needed for further characterization.

Nevertheless, for purposes of this disclosure, the tests associated with the third brush provide that after accelerated environmental conditioning, the immiscible composition is still present on the brush. That is, both a hydrophobic conditioning agent (PDMS) and a hydrophilic polymeric material (Nylon 6 and/or Nylon 6,6) were present in the bristle core of the brush. This is notable, as the results of FIGS. 5A-5D provide that the immiscible composition comprises a lengthy shelf-life. Shelf-life is an important feature, as there may be various times throughout the life of a device, as described herein, where the device goes unused for a substantial period of time. The present disclosure, then, allows for a user to be able to continue to receive the beneficial conditioning properties of the immiscible composition over a longer period of time, thus saving consumer costs and time.

Example 2

Conditioning Release of PDMS onto Hair from Device Plate

The following example illustrates the analysis of a panel of a personal care device coated with the immiscible composition discussed herein.

The immiscible composition discussed above comprising a hydrophobic conditioning agent and a hydrophilic polymeric material was coated onto a panel of a personal care device. More particularly, the personal care device was a hair straightener.

The coated panel was placed into a laboratory oven set at 200° C. and allowed to acclimatize for several minutes. A reference hair sample was then utilized to directly wipe the surface of the coated panel of the device. FTIR analysis of the hair following the wipe resulted in the FTIR spectra shown in FIGS. 6A-6C.

Figures 6A, 6B, 6C:
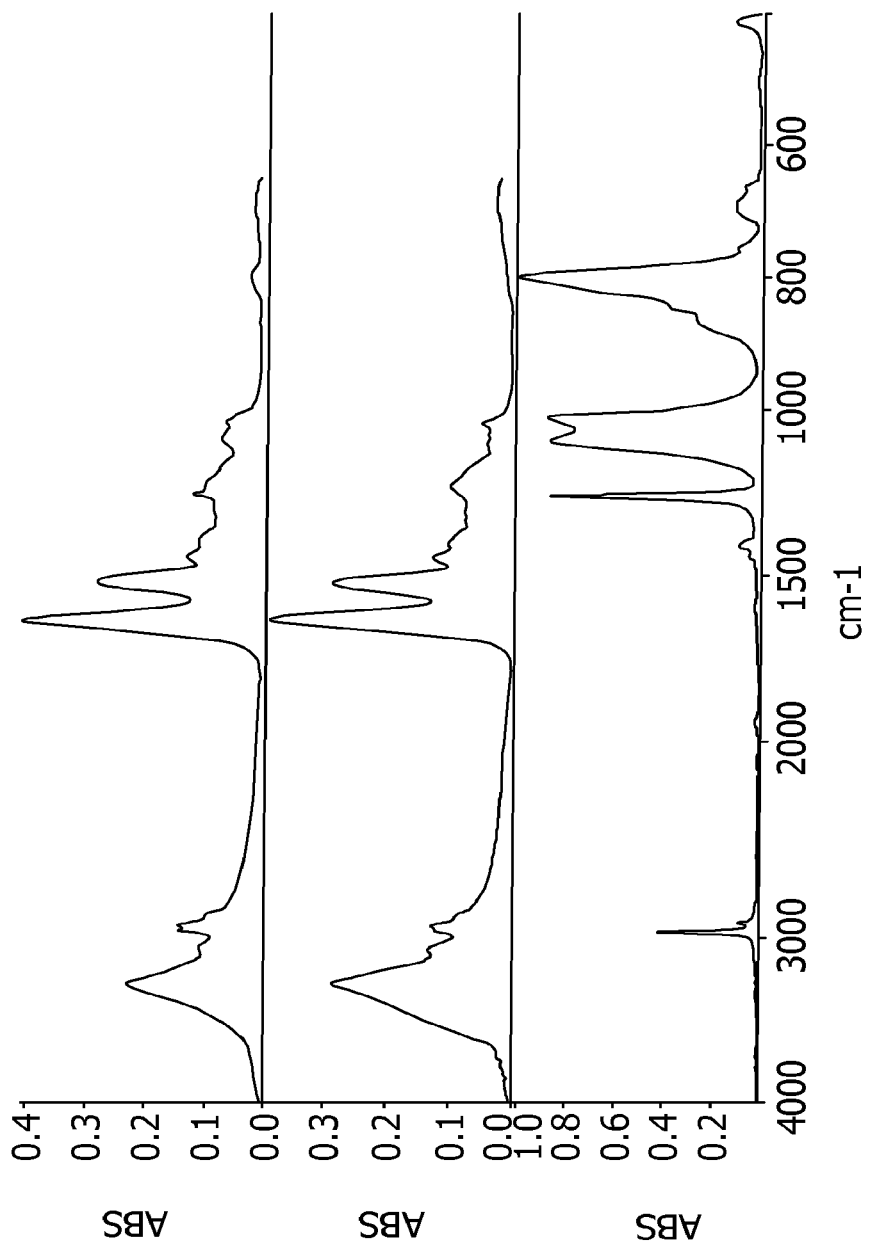
FIGS. 6A-6C depict FTIR spectra, as further detailed in Example 2. Specifically.

Specifically, FIG. 6A provides the spectrum results for the surface of the coated panel. FIG. 6B provides the spectrum results for the reference hair sample that was wiped across the surface of the coated panel. FIG. 6C provides the spectrum results of a conditioning agent (PDMS).

Analysis of the spectra indicate that the PDMS remained present on the coated panel after wiping the reference hair sample, and, further, that the PDMS was present in the reference hair sample after wiping the coated panel. Thus, this Example provides that after coating the panel with the immiscible composition, heating the panel and wiping a reference hair sample, a transfer of the conditioning agent from the coated panel to the reference hair sample occurred.

It is to be noted that, through methods generally known in the art, it can be observed that after the personal care device comes into contact with a surface, the conditioning agent is imparted into the contact surface. It can be further observed that after at least about 10,000, 20,000 or 30,000 hair strokes or contacts with a user's skin, the conditioning agent continues to migrate to the contact surface of the user. As a result, the personal care device of the present disclosure advantageously enables the prolonged release or migration of the hydrophobic conditioning agent to the contact surface of the user of the personal care device.

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

The invention claimed is:

1. A method for coating a hair styling device with a conditioning layer for contacting a hair surface, the method comprising
   preparing an immiscible composition comprising a hydrophilic material that is capable of being cured by a sol-gel process, and a hydrophobic conditioning agent fluid;
   spraying or dip coating the immiscible composition onto a surface of a component of the hair styling device; and
   curing the immiscible composition by a sol-gel process to form a conditioning layer on the surface of the component of the hair styling device, the conditioning layer comprising a) a porous matrix formed from the hydrophilic material having pores, and b) having the hydrophobic conditioning agent fluid dispersed in the pores thereof, such that the conditioning agent can migrate to an exposed surface of the conditioning layer and then may be transferred from the conditioning layer on the surface of the component of the hair styling device to a contact surface of the hair;
   wherein the hair styling device is selected from the group consisting of a hair straightener, curling iron, comb, brush, curler, dryer, attachment for such a device, and combinations thereof.

2. The method of claim 1, wherein the hydrophilic material comprises inorganic polymers.

3. The method of claim 1, wherein the porous matrix is prepared by forming a cationic network of metal alkoxides.

4. The method of claim 1, wherein the porous matrix comprises additional additives selected from ceramics and pigments.

5. The method of claim 1, wherein the immiscible composition is introduced onto the surface of the component of the hair styling device by spraying.

6. The method of claim 1, wherein the pores have a size in the range of from about 50 nanometers to about 50 microns.

7. The method of claim 1, wherein the conditioning layer comprises from about 0.1% by weight to about 12% by weight of the conditioning agent.

8. The method of claim 1, wherein the conditioning agent is selected from the group consisting of a silicone-based oil, siloxane-based polymer, silicone derivative, silicone polyester, silicone polyether fluid, dimethyl silicone fluid, dimethyl silicone emulsion, amino silicone fluid, amino silicone emulsion, polydimethylsiloxane, and combinations thereof.

9. The method of claim 1, wherein the conditioning agent is polydimethylsiloxane.

10. The method of claim 1, wherein the conditioning agent has a viscosity of from about 5 centistokes to about 5000 centistokes.

11. The method of claim 1, wherein the conditioning agent has a flash point of at least about 150° C.

12. The method of claim 1, wherein the immiscible composition is cured at a temperature from about 160° C. to about 300° C. to form the conditioning layer.

13. The method of claim 1, wherein the immiscible composition is cured at about room temperature to form the conditioning layer.

* * * * *